United States Patent
De Matos Antunes Ferreira et al.

(10) Patent No.: US 12,276,541 B2
(45) Date of Patent: Apr. 15, 2025

(54) METHOD AND SYSTEM FOR NON-INVASIVE VIBRATION-BASED CONDITION MONITORING OF A MACHINE

(71) Applicant: International Iberian Nanotechnology Laboratory (INL), Braga (PT)

(72) Inventors: Ricardo Alexandre De Matos Antunes Ferreira, Braga (PT); Tim Böhnert, Braga (PT); Elvira Paz Pérez De Colosía, Braga (PT)

(73) Assignee: INTERNATIONAL IBERIAN NANOTECHNOLOGY LABORATORY (INL), Braga (PT)

( * ) Notice: Subject to any disclaimer, the term of this patent is extended or adjusted under 35 U.S.C. 154(b) by 257 days.

(21) Appl. No.: 17/996,081

(22) PCT Filed: Apr. 27, 2021

(86) PCT No.: PCT/IB2021/053472
§ 371 (c)(1),
(2) Date: Oct. 13, 2022

(87) PCT Pub. No.: WO2021/220162
PCT Pub. Date: Nov. 4, 2021

(65) Prior Publication Data
US 2023/0142616 A1    May 11, 2023

(30) Foreign Application Priority Data

Apr. 27, 2020  (PT) .......................................... 116300
Aug. 7, 2020   (EP) ..................................... 20190156

(51) Int. Cl.
*G01H 11/04*    (2006.01)
*G01M 99/00*    (2011.01)

(52) U.S. Cl.
CPC .......... *G01H 11/04* (2013.01); *G01M 99/005* (2013.01)

(58) Field of Classification Search
CPC ............................ G01M 99/005; G01H 11/04
(Continued)

(56) References Cited

U.S. PATENT DOCUMENTS 6,208,133 B1    3/2001  Ehling et al.
10,969,269 B1*  4/2021  Mazumdar ............... G01B 7/14
(Continued)

FOREIGN PATENT DOCUMENTS

CN    115060353 A  *  9/2022
DE    202016003492 U1 *  7/2016
(Continued)

OTHER PUBLICATIONS

DE202016003492 Jul. 28, 2016 (Year: 2016).*
(Continued)

*Primary Examiner* — Xin Y Zhong
*Assistant Examiner* — Monica S Young
(74) *Attorney, Agent, or Firm* — LUCAS & MERCANTI, LLP

(57) ABSTRACT

A method and a device for non-invasive vibration-based condition monitoring of a machine placed on a physical frame of reference, using a time-domain broadband magnetoresistive sensor having a sensor transfer function of electric resistance versus magnetic field intensity, said machine comprising an attached magnet or a magnetic part; comprising the steps of: placing the magnetic sensor on said physical frame of reference at a distance from the machine and at a predetermined distance from the magnet or magnetic part, such that the magnetoresistive sensor is operating in a dynamic part of the sensor transfer function in respect of the magnetic field produced by the magnet or a magnetic part;
(Continued)

capturing a time-domain magnetic field signal transduced by the sensor; and using an electronic data processor to process the captured signal to obtain a vibration-based indicator of the machine's condition.

9 Claims, 4 Drawing Sheets

(58) Field of Classification Search
USPC .................................................. 73/865, 658
See application file for complete search history.

(56) References Cited

U.S. PATENT DOCUMENTS

| | | | |
|---|---|---|---|
| 2002/0123860 A1* | 9/2002 | Fioravanti | G11B 5/59627 |
| | | | 702/182 |
| 2009/0315548 A1* | 12/2009 | Bonin | G01R 33/025 |
| | | | 324/244 |
| 2011/0196635 A1* | 8/2011 | Sheu | G01D 5/2451 |
| | | | 702/65 |
| 2012/0059604 A1* | 3/2012 | Sheu | G01H 11/02 |
| | | | 702/56 |
| 2019/0219421 A1* | 7/2019 | Hoffmann | G01D 21/00 |
| 2020/0081077 A1* | 3/2020 | Katti | G01H 11/02 |
| 2020/0326361 A1* | 10/2020 | Jenkins | H03B 28/00 |
| 2023/0142616 A1* | 5/2023 | De Matos Antunes Ferreira ........ |
| | | | G01H 11/04 |
| | | | 73/658 |

FOREIGN PATENT DOCUMENTS

| | | | | |
|---|---|---|---|---|
| EP | 3273203 A1 | 1/2018 | | |
| GB | 2338848 A | 12/1999 | | |
| GB | 2343253 A | 5/2000 | | |
| KR | 2002057333 A | * | 7/2002 | ............. G01H 11/04 |
| WO | 2019233660 A1 | 12/2019 | | |

OTHER PUBLICATIONS

Intenational Search Report and Written Opinion for corresponding PCT Application No. PCT/IB2021/053472 mailed on Aug. 2, 2021 (15 pages).

* cited by examiner

METHOD AND SYSTEM FOR NON-INVASIVE VIBRATION-BASED CONDITION MONITORING OF A MACHINE

CROSS-REFERENCE TO RELATED APPLICATIONS

This application is a U.S. National Phase Application under 35 U.S.C. § 371 of International Application No. PCT/IB2021/053472, filed Apr. 27, 2021, which claims priority to Portugal Patent Application No. 116300, filed Apr. 27, 2020 and EP patent application No. 20190156.8, filed Aug. 7, 2020, the contents of which are hereby incorporated by reference in their respective entireties.

TECHNICAL FIELD

The present disclosure relates to a method and a device for non-invasive condition monitoring of machines, in particular of a machine placed on a physical frame of reference, using a time-domain broadband magnetoresistive sensor having a sensor transfer function of electric resistance versus magnetic field intensity.

BACKGROUND

Predictive maintenance involves analysing data from condition monitoring of machines. Deviation from baseline data pattern emerges when a machine part starts deteriorating. Analysing data from condition monitoring allows users to schedule predictive maintenance and avoid emergency downtime from machine failure.

Conventional condition monitoring techniques include: oil analysis, vibration analysis, motor circuit analysis, ultrasonic monitoring, acoustic analysis, radiation analysis, laser interferometry, electrical monitoring, electromagnetic measurement, performance monitoring, etc.

Condition monitoring involving electromagnetic measurement typically involves measuring distortions in magnetic field as well as changes in eddy field current in order to identify defects or deterioration in machine and machine parts. Examples of techniques of electromagnetic measurement are magnetic particle inspection, magnetic flux leakage, pulsed eddy currents, remote and near field eddy current.

Condition monitoring involving vibration analysis utilizes changes in vibration to identify machine and machine parts deterioration. Misalignments, imbalances, wear and tear on machine parts often causes these machine parts to vibrate differently from their usual baseline vibration patterns. Examples of techniques of vibration analysis include broadband vibration analysis, time waveform analysis and spectrogram analysis.

However, current conditional monitoring methods and devices are often expensive, unsafe, delicate, requires precise alignment, requires highly skilled operators to perform, requires exposing the internal parts of the machine in order to install the monitoring device and, may be unreliable in dusty and dirty environments.

Monitoring the condition of existing machines requires some level of knowledge of the machine details and functional principles, such as where are the critical moving parts located, how can they be accessed, where can foreign sensors be installed safely, how to safely install the extra cables required by wired sensors, etc. As a consequence, different machines end up being monitored by different sets of sensors, placed in different numbers in order to monitor the different types of machine parts.

As such, there is a need for a more sensitive but still cheaper, simpler and non-invasive method for condition monitoring of machines that can be applied more universally, i.e., regardless of the nature of the machine.

Document EP 3273203 A1 discloses a displacement detection device which can determine displacement of a detection target. The displacement detection device includes a magnet which is displaced in a displacement direction Ds, is rod-shaped and has a form in which a longitudinal direction and the displacement direction Ds form a predetermined angle, and a sensor IC which detects a magnetic flux density of a magnetic field formed by the magnet in an x direction and a z direction orthogonal to the displacement direction Ds and outputs a signal proportional to the magnetic field detected.

Document US 2019219421 A1 discloses a displacement sensor comprising a magnetic field source generating a magnetic field and a magnetic field sensor arrangement adapted to contactlessly detect a relative position of the magnetic field source with respect to the magnetic field sensor arrangement. The magnetic field sensor arrangement includes a first magnetic field sensor adapted to generate a first position signal and a second magnetic field sensor adapted to generate a second position signal. Each of the first magnetic field sensor and the second magnetic field sensor has a magnetic field probe adapted to detect a magnetic flux density of the magnetic field, an evaluation unit for evaluating an output signal of the magnetic field probe, and a communication interface for emitting and receiving a plurality of communication signals. The first magnetic field sensor and the second magnetic field sensor are connected to each other via a data bus for transmitting the communication signals.

Document U.S. Pat. No. 6,208,133 B1 discloses a method and apparatus for calibrating the output signal of a linear position detector without accessing the interior of the detector housing. A magnet is selectively movable toward and away from the exterior of the electronics housing, and a sensor is provided within the housing for sensing the presence of the magnet. The linear position detector is calibrated by setting a movable marker at the desired position and pushing the magnet toward the housing. The sensor then detects the presence of the magnet, and a processor saves the position of the marker as a reference point. All future positions of the marker can then be scaled based upon the reference point. Thus, the linear position detector can be calibrated without the need for opening the electronics housing and potentially exposing the electronics components to moisture, contaminants, and/or static electricity.

These facts are disclosed in order to illustrate the technical problem addressed by the present disclosure.

GENERAL DESCRIPTION

The present disclosure relates to a method and a device for non-invasive condition monitoring of machines.

Current conditional monitoring methods and devices are often expensive, unsafe, delicate, requires precise alignment, requires highly skilled operators to perform, requires exposing the internal parts of the machine in order to install the monitoring device and, may be unreliable in dusty and dirty environments.

Monitoring the condition of existing machines requires some level of knowledge of the machine details and functional principles, such as where are the critical moving parts located, how can they be accessed, where can foreign sensors be installed safely, how to safely install the extra cables required by wired sensors, etc. As a consequence, different machines end up being monitored by different sets of sensors, placed in different numbers in order to monitor the different types of machine parts.

As such, there is a need for a cheaper, simpler and non-invasive method for condition monitoring of machines that can be applied more universally, i.e., regardless of the nature of the machine.

The present disclosure relates to a method and a device for non-invasive monitoring of machine that is cheaper, simpler and does not require installing wires on/in the machine, or opening up the machine to expose the internal moving parts. Therefore, the method described in the present disclosure is able to monitor any machine with internal moving parts, regardless of the nature of the machine.

In an embodiment, the method and the device described in the present disclosure characterizes the operational status of a machine and the moving parts in the machine.

In an embodiment, the method and the device described in the present disclosure measures displacements in the machine frame without the need for installing wires or accessing the interior of the machine.

In an embodiment, the method and the device described in the present disclosure measures displacements that can occur over a wide bandwidth of frequencies (DC 10 MHz).

In an embodiment, the method and the device described in the present disclosure measures displacements caused by mechanical motion of the machine and the moving parts in the machine.

In embodiment, the method and the device described in the present disclosure measures displacements in the machine frame that are caused by mechanical motion of the machine and the internal moving parts in the machine. The machine frame machine is used as a mechanical waveguide that transmits the effect of the motion of a plurality of particular inner components making part of the machine. The inner components may be coupled directly or indirectly to the machine frame). The inner components may be coupled directly or indirectly to a point of the machine frame in the exterior of the machine that is monitored by the sensor.

In an embodiment, a magnet is placed on the machine frame. This magnet serves two purposes: it acts as a transducer of mechanical motion and it amplifies the effect of such motions by creating a large magnetic field that can be detected by a magnetic field sensor with a sensitivity large enough to detect magnetic field variations associated with displacements of at least nanometre in range.

In an embodiment, the present disclosure relates to a method for non-invasive (i.e. without having to access the internal parts of the machine) vibration-based condition monitoring of a machine placed on a physical frame of reference, using a time-domain broadband magnetoresistive sensor having a sensor transfer function of electric resistance versus magnetic field intensity, said machine comprising an attached magnet or a magnetic part (i.e. a part of the machine);

comprising the steps of:
placing the magnetic sensor on said physical frame of reference at a distance from the machine, i.e. externally to said machine, and at a predetermined distance from the magnet or magnetic part, such that the magnetoresistive sensor is operating in a dynamic part of the sensor transfer function in respect of the magnetic field produced by the magnet or a magnetic part; and capturing a time-domain magnetic field signal transduced by the sensor; using an electronic data processor to process the captured signal to obtain a vibration-based indicator of the machine's condition.

A magnetic part (i.e. a part of the machine) can be defined as being a part of the machine that affects a magnetic field that can be detected outside by the sensor, including ferromagnetic parts, parts with a magnetic susceptibility that causes distortions in the earth's magnetic field outside the tool, current windings, power lines etc . . . .

The time-domain magnetic field signal transduced by the sensor can be defined as a signal that is resolved in time with high resolution, taking profit of the sensor broadband characteristics. This should take into account that not all prior art sensors have a time resolved output. In other words, most of the prior art sensors are limited to quasi-DC outputs, or limited to very low frequencies, thus unable to effectively reconstitute (transduce) a time-domain signal.

In an embodiment, the broadband magnetoresistive sensor has a broadband response that includes 0 Hz or a DC component, in particular the broadband magnetoresistive sensor has a broadband response that includes 0 Hz to 1 KHz, or 0 Hz to 100 KHz, or 0 Hz to 1 MHz, or 0 Hz to 1 GHz.

The time-resolution of the time-domain signal acquired from the sensor is limited by the sensor bandwidth and by the capability of the electronics used to acquire such signal. A sensor with an upper frequency bandwidth limited at $f_{max}$, is capable of resolving events in the tool being monitored with a time resolution of $1/f_{max}$. A sensor max with a frequency bandwidth up to 1 GHz can resolve events down to 1 ns in time-domain. For example, a coil-based sensor will not generally provide the required time-domain resolution, in particular the 0 Hz or a DC component will not be detectable.

In an embodiment, the method for non-invasive condition monitoring of a machine comprises the preceding step of attaching the magnet on an exterior surface or on the machine frame to which the internal moving parts of interest are mechanically coupled. The parts of interest are mechanically coupled directly or indirectly, for example rotatably, slidably or pivotably coupled, such that the vibrations of interest are transmitted to the machine frame or external surface at the point where the magnet is placed (or alternatively, the part of interest, frame or external surface, can be magnetic).

In an embodiment, the magnet has been previously attached to an internal part of the machine.

In an embodiment, the method for non-invasive condition monitoring of a machine is for monitoring a specific part of said machine, wherein the internal part of the machine is the specific part to be monitored.

In an embodiment, the magnetoresistive sensor is operating in a linear part of the sensor transfer function in respect of the magnetic field produced by the magnet or a magnetic part.

In an embodiment, the magnetoresistive sensor is: a magnetic tunnel junction, MTJ, sensor; a tunnel magnetoresistance, TMR, sensor; a giant magnetoresistance, GMR, sensor; or an anisotropic magnetoresistive, AMR, sensor.

In an embodiment, the predetermined distance and the MTJ sensor are arranged such that the MTJ sensor is being operated within a linear response portion of the MTJ sensor input-output function.

In an embodiment, the sensor is arranged such that the linear response portion of the sensor has a detection limit of displacement of the magnet or the magnetic part of not more than 15 nm of vibration of the magnet or magnetic part, in particular not more than 10 nm, further in particular not more than 1 nm.

In an embodiment, the magnet is a neodymium magnet or an electromagnet.

In an embodiment, the magnet is a compound magnet comprising an assembly of a plurality of magnets for increasing the gradient of the produced magnetic field.

In an embodiment, the physical frame of reference is fixed relative to the ground.

In an embodiment, the magnetic sensor is placed on a vibration-dampening or mechanically-decoupled stand which is placed on said physical frame of reference.

In an embodiment, the present disclosure relates to a system for non-invasive vibration-based condition monitoring of a machine placed on a physical frame of reference, said machine comprising an attached magnet or a magnetic part, the system comprising:
  a time-domain wideband magnetoresistive sensor having a sensor transfer function of electric resistance versus magnetic field intensity, said machine comprising an attached magnet or a magnetic part, for placing on said physical frame of reference at a distance from the machine, i.e. externally to said machine, and at a reference distance from the magnet or magnetic part, wherein the magnetoresistive sensor is operating in a dynamic part of the sensor transfer function in respect of the magnetic field produced by the magnet or a magnetic part; and an electronic data processor configured for:
  capturing a time-domain magnetic field signal transduced by the sensor; and processing the captured signal to obtain a vibration-based indicator of the machine's condition.

In an embodiment, the wideband of the system comprises 0 Hz or a DC component, in particular the broadband magnetoresistive sensor has a broadband response that includes 0 Hz to 1 KHz, or 0 Hz to 100 KHz, or 0 Hz to 1 MHz, or 0 Hz to 1 GHz.

In an embodiment, the magnetoresistive sensor of the system is: a magnetic tunnel junction, MTJ, sensor; a tunnel magnetoresistance, TMR, sensor; a giant magnetoresistance, GMR, sensor; or an anisotropic magnetoresistive, AMR, sensor.

In an embodiment, the electronic data processor of the system is configured for processing the captured signal which is obtained when the MTJ sensor operates within a linear response portion of the MTJ sensor input-output function.

In an embodiment, the linear response portion of the sensor in the system has a detection limit of not more than 15 nm of vibration of the magnet or magnetic part, in particular not more than 10 nm, further in particular not more than 1 nm.

In an embodiment, the magnet in the system is a neodymium magnet or an electromagnet or a compound magnet comprising an assembly of a plurality of magnets arranged for increasing the gradient of the produced magnetic field.

In an embodiment, the physical frame of reference of the system is a ground.

In an embodiment, the system for non-invasive condition monitoring of a machine comprises the magnet, thus not requiring the use of the magnetic part.

In an embodiment, the present disclosure relates to use of a time-domain wideband magnetoresistive sensor having a sensor transfer function of electric resistance versus magnetic field intensity, for non-invasive vibration-based condition monitoring of a machine placed on a physical frame of reference, said machine comprising an attached magnet or a magnetic part, said use comprising:
  placing the magnetic sensor on said physical frame of reference at a distance, i.e. externally to said machine, from the machine and at a predetermined distance from the magnet or magnetic part, such that the magnetoresistive sensor is operating in a dynamic part of the sensor transfer function in respect of the magnetic field produced by the magnet or a magnetic part; and
  capturing a time-domain magnetic field signal transduced by the sensor; using an electronic data processor to process the captured signal to obtain a vibration-based indicator of the machine's condition.

In an embodiment, the magnetoresistive sensor in the use of a domain wideband magnetoresistive sensor is: a magnetic tunnel junction, MTJ, sensor; a tunnel magnetoresistance, TMR, sensor; a giant magnetoresistance, GMR, sensor; or an anisotropic magnetoresistive, AMR, sensor.

A dynamic part of a sensor transfer function is a part of the transfer function that is strictly monotonic, i.e. where an increment in the magnetic field being measured results in an increment in the magnetoresistive sensor output resistance. In practice, the sensor will be operating as close as possible to the magnet or magnetic part, without saturating the sensor. Advantageously, this can be achieved in an easier manner by using a relatively weaker magnet and a more sensitive sensor (like the magnetoresistive sensors described herein, in particular a magnetic tunnel junction, MTJ, sensor).

The captured magnetic field signal transduced by the sensor is a time-domain signal, thus including non-periodic data, i.e. transient data, which is advantageous for obtaining information relevant for monitoring vibration-based conditions from the machine being monitored.

In particular, the broadband magnetoresistive sensor has a broadband response that includes 0 Hz to 1 KHz, or 0 Hz to 100 KHz, or 0 Hz to 1 MHz, or 0 Hz to 1 GHz.

In particular, the magnet can be attached to an internal part or to the machine frame.

A compound magnet comprises an assembly of a plurality of magnets is able to increase the gradient of the produced magnetic field in specific spatial regions while keeping the magnetic field value below the saturation field of the sensor. Thus, increasing the signal gradient on the dynamic part of the sensor transfer function in respect of the magnetic field produced by the compound magnet.

BRIEF DESCRIPTION OF THE DRAWINGS

The following figures provide preferred embodiments for illustrating the disclosure and should not be seen as limiting the scope of invention.

DETAILED DESCRIPTION

The present disclosure relates to a method and a device for non-invasive condition monitoring of machines.

Current conditional monitoring methods and devices are often expensive, unsafe, delicate, requires precise alignment, requires highly skilled operators to perform, requires exposing the internal parts of the machine in order to install the monitoring device and, may be unreliable in dusty and dirty environments.

Monitoring the condition of existing machines requires some level of knowledge of the machine details and functional principles, such as where are the critical moving parts located, how can they be accessed, where can foreign sensors be installed safely, how to safely install the extra cables required by wired sensors, etc. As a consequence, different machines end up being monitored by different sets of sensors, placed in different numbers in order to monitor the different types of machine parts.

Figure 1:
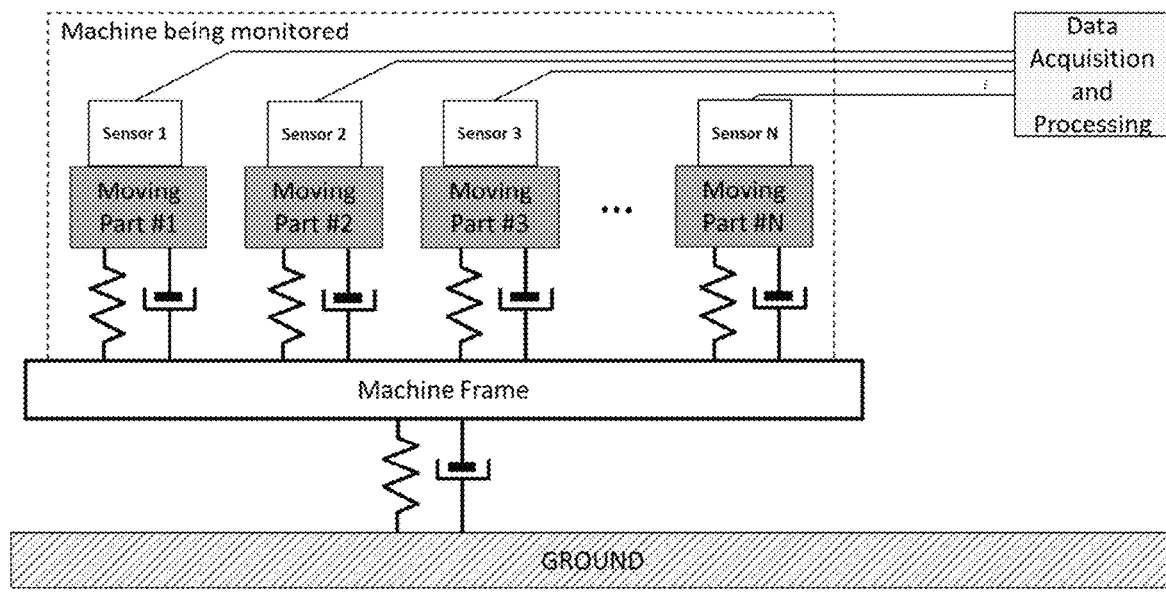
FIG. 1 is a schematic illustration of a setup describing the conventional method to monitor moving parts inside a machine.

FIG. 1 is a schematic illustration of the conventional method for condition monitoring of a machine with several internal moving parts. Conventionally, each moving part is monitored by a sensor or set of sensors placed in contact or even inside the part being monitored. This is an invasive solution which requires foreign sensors and wires to be added to the machine, which is not always possible or safe. Furthermore, a prior knowledge of the moving parts location, nature of the motion and nature of the moving part itself is required to install appropriate sensors in the appropriate positions in order to extract useful information.

As such, there is a need for a cheaper, simpler and non-invasive method for condition monitoring of machines that can be applied more universally, i.e., regardless of the nature of the machine and its internal parts.

The present disclosure relates to a method and a device for non-invasive monitoring of machine that is cheaper, simpler and does not require installing wires on/in the machine, or opening up the machine to expose the internal moving parts. Therefore, this method can be used to monitor any machine with internal moving parts, regardless of the nature of the machine.

In an embodiment, the method and device of the present disclosure include the use of a magnet placed on the machine frame. This magnet is solidary with the frame and creates a magnetic field with a magnitude that decays in space with the distance from the magnet. A magnet placed in a position $\vec{r}_0$, generates a magnetic field $\vec{H}(\vec{r}-\vec{r}_0)$ that will change with respect to the placement of the magnet and the position in space considered.

In an embodiment, the method and device of the present disclosure include the use of a magnetic field sensor placed in the vicinity of the magnet, without contact and at a distance which is generally of the order from 0.1 cm to 10 cm, but can be further away, for example 1 cm-1 m or 1 m-10 m. This distance is preferably large enough for the magnetic field created by the magnet in the position occupied by the magnetic field sensor to fall within the dynamic range of the magnetic field sensor. If this condition is met, the magnetic field sensor will operate as a transducer which will convert the magnetic field in the position occupied by the sensor, $\vec{r}_s$, into a voltage which can be read and digitized by an appropriate electronics circuit. The transduction of magnetic field into voltage is determined by the sensitivity of the magnetic field sensor, dV/dH, which depends on the nature of the magnetic field sensor.

Figure 2:
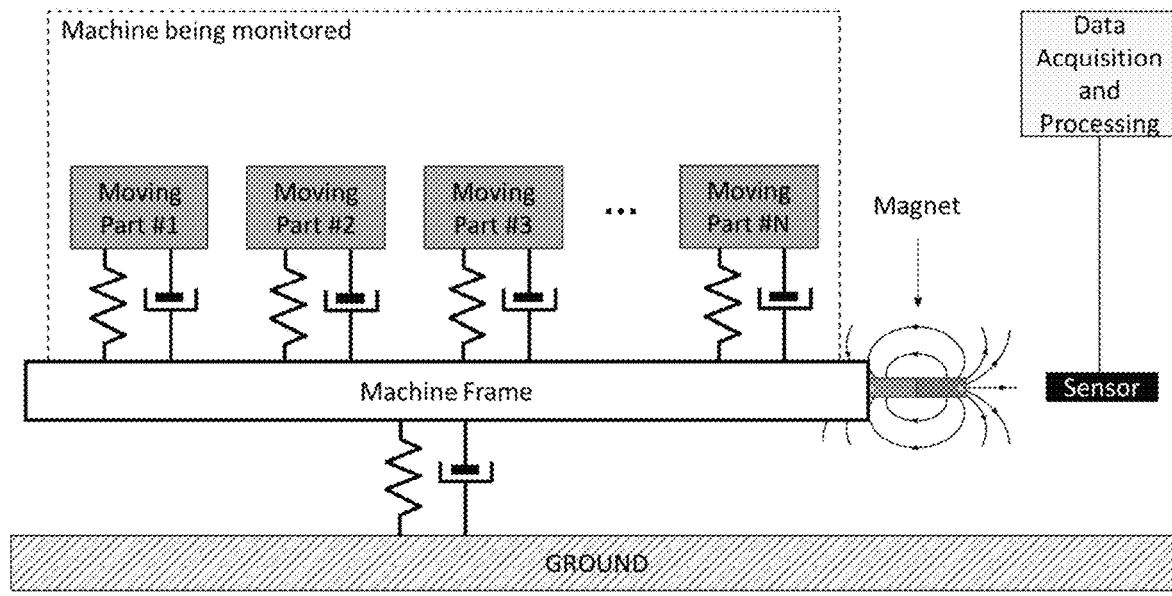
FIG. 2 is a schematic illustration of a setup according to an embodiment of the disclosure for non-invasive monitoring of a machine.

As shown in FIG. 2, any mechanical motion of any moving part of the machine that is mechanically coupled to the machine frame is transmitted to such frame that acts as a mechanical waveguide collecting mechanical energy from all different sources. Such motion in the frame results in a motion of the magnet, which is attached, for instance, to the tool frame. As a result, the position of the magnet changes with time $\vec{r}_0 = \vec{r}_0(t)$ and so does the magnetic field in the fixed location where the magnet is placed $\vec{H}(\vec{r}_s,t) = \vec{H}(\vec{r}_a - \vec{r}_0(t))$. As a result, a displacement of the tool frame $\Delta \vec{r}$ generates a change of the magnetic field in the location of the magnetic field sensor which is given by $$\Delta \vec{r} \frac{d\vec{H}}{d\vec{r}}(\vec{r}_s)$$

which in turn is converted to a change in the output voltage of the magnetic field sensor as a result of the intrinsic sensitivity of the sensor:

$$\Delta V = \Delta \vec{r} \frac{d\vec{H}}{d\vec{r}}(\vec{r}_s) \frac{dV}{d\vec{H}}.$$

The magnetic field sensor and the magnetic field gradient may be arranged such that the magnetic field gradient at the position of installation of the magnetic field sensor is large enough to generate a voltage variation across the sensor that is above the noise level of the electronics circuit used to monitor said voltage for displacements of the frame in the nanometer range.

The magnetic field sensor and the electronics circuit used to monitor the magnetic field sensor output may operate over a large frequency range (DC-10 MHz), allowing the motion of the frame to be monitored across a large range of time scales.

Due to the rapidly decreasing intensity of the magnetic field across space, the magnetic field sensor selectively may detect the motion of the frame at the point of contact or installation of the magnet. The magnet may form part of the machine to be monitored or, alternatively, may be permanently or detachably mounted onto the machine at a contact point. The mechanical motion in neighbouring machines will have negligible disturbance as compared with the displacement signal generated at the tool where the device is installed.

In an embodiment, the device comprises a data acquisition apparatus capable of acquiring and digitizing the data collected by the magnetic field sensor. The acquiring and digitizing the data may be at very fast rates (up to 10 Msps) with a noise level comparable to the intrinsic noise of the magnetic field sensor.

In an embodiment, the device comprises a data analysis software capable of analyzing the data collected, namely by producing a dynamic spectrograph that can be used to characterize different machine part's operational modes.

In an embodiment, operating in the time domain, the data acquisition apparatus together with the data analysis software will generate an output which will depend on the motion of the different moving parts in the machine.

In an embodiment, as an example, moving parts in the machine with periodic mechanical motions with different characteristic frequencies can be identified as different Fourier components along the time trace. Additionally, parts operating at similar frequencies will generate different time traces that depend on the magnitude of the movements, relative phase difference between them, distance between the parts and the permanent magnet and type of mechanical coupling between these parts and the machine's exterior frame.

In an embodiment, the device comprises a data processing software which correlates the data collected with critical failures (reactive maintenance needs) as well as with the aging process of different moving parts in the machine for the purpose of predictive maintenance.

Figure 3:
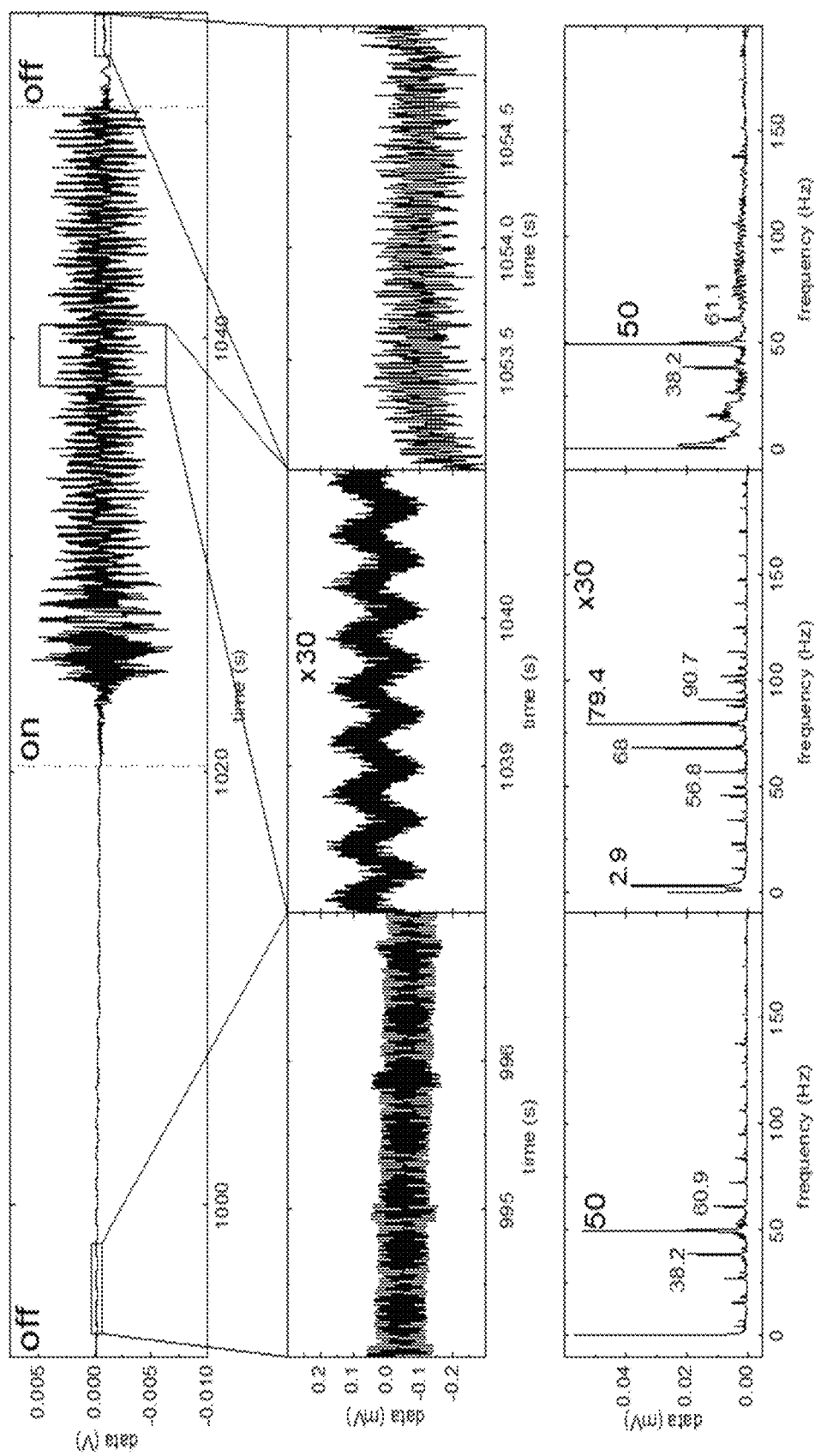
FIG. 3 shows an example of a time-domain signal obtained from a test machine using the sensor according to an embodiment of the disclosure during three time periods (all machinery off, main machine part on and pump off, main machine part off and pump on).

FIG. 3 shows an example of a time-domain signal obtained from a test machine using the magnetic field sensor according to an embodiment of the disclosure during three time periods (all machinery off, main machine part on and pump off, main machine part off and pump on).

Figure 4:
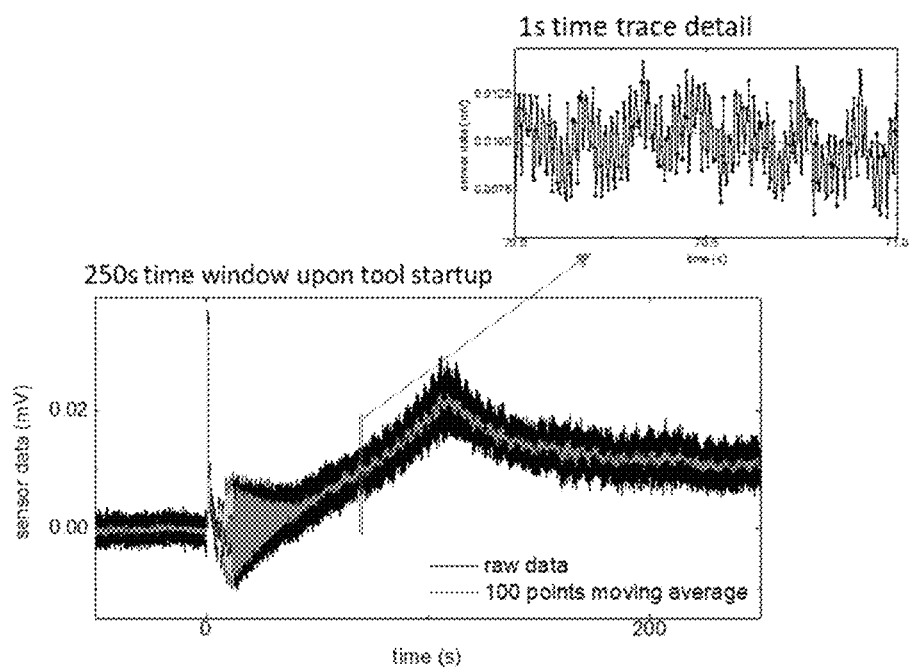
FIG. 4 shows an example of a time-domain signal obtained from a test machine using the sensor according to an embodiment of the disclosure during machine start up.

FIG. 4 shows an example of a time-domain signal obtained from a test machine using the magnetic field sensor according to an embodiment of the disclosure during machine start up, with zoomed in excerpts.

Figure 5:
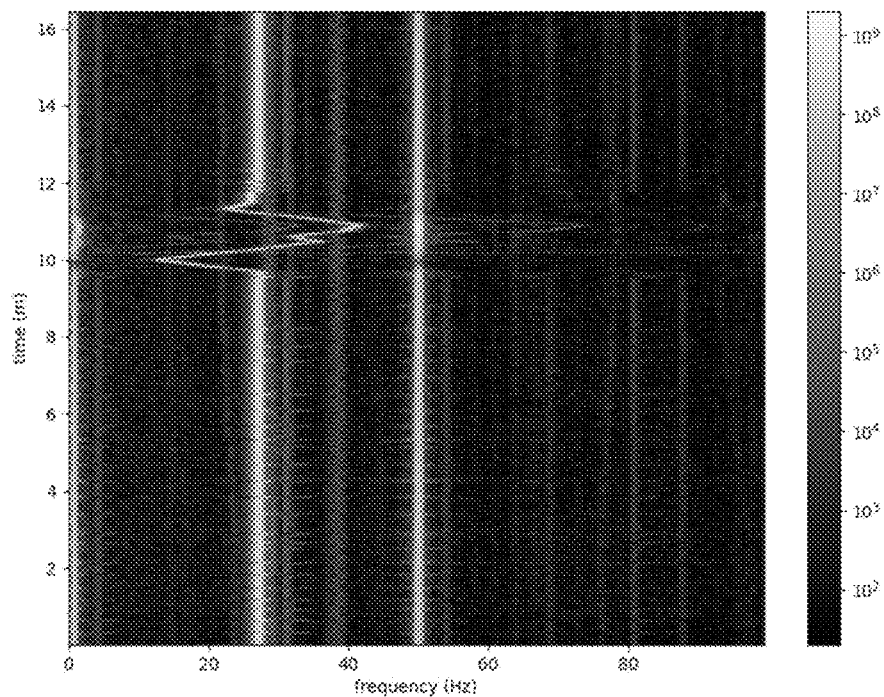
FIG. 5 is an example of a spectrogram obtained from a test machine.

FIG. 5 is an example of a spectrogram obtained from a test machine for a duration of 16 minutes.

Figure 6:
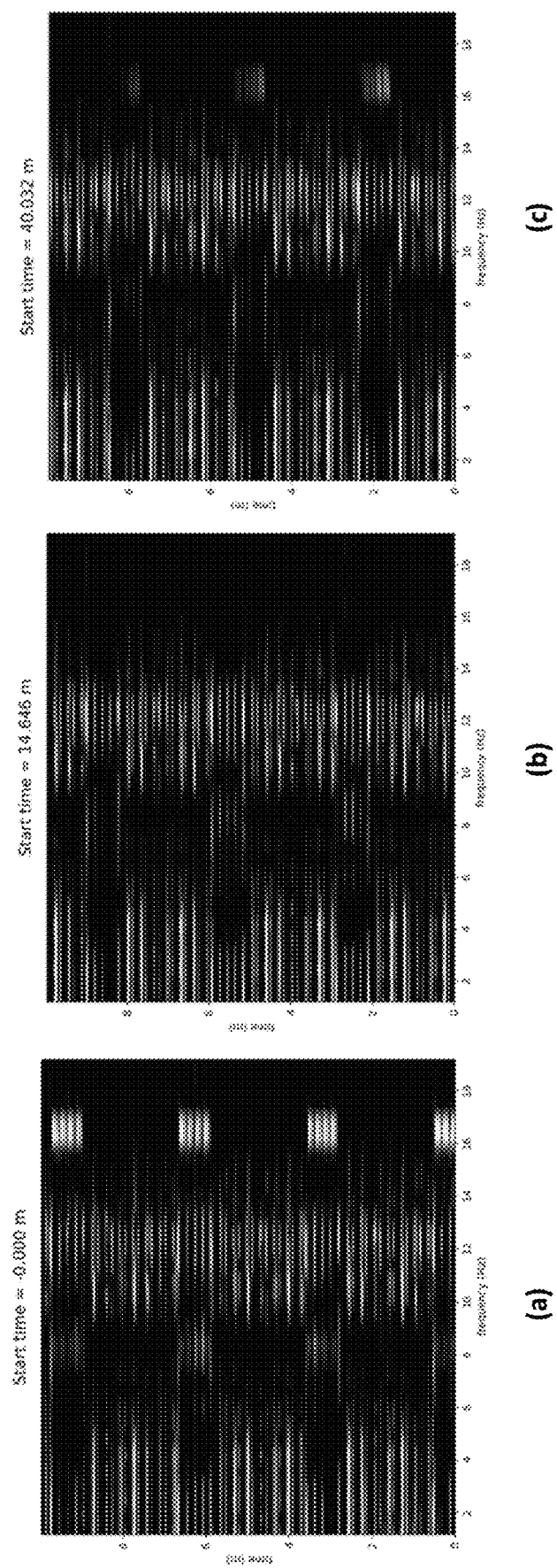
FIG. 6 is an example of a segment of data obtained in a complex machine made of many different parts and illustrating how information about particular internal components and failure conditions can be extracted from the data collected by the sensor, where (a) shows a normal period of operation, (b) shows an abnormal period of operation where a motor is abnormally inoperative (note the absence of the repeating time-domain pattern around the 16 Hz-17 Hz mark), (c) shows an abnormal period of operation where there is a compressed air failure (note the repeating dwindling time-domain pattern around the 16 Hz-17 Hz mark).

FIG. 6 is an example illustrating how information about particular internal components and failure conditions can be extracted from the data collected by the sensor monitoring a very complex machine made of many different parts. The data in FIG. 6 was collected in a machine operating in a real environment. The data was collected with the sensor placed outside the tool, in the physical reference frame (the ground) and with a magnet placed in the external surface of the tool frame at a distance of 10 cm from the sensor. The data was collected in a factory with other machines operating in the vicinity of the machine being monitored. The top inset spectrogram shows the data collected with the machine operating in normal conditions and executing a repetitive task. In this spectrogram a data feature is seen to occur about every 2 minutes with a signature in the frequency range between 16-17 Hz made of 4 pulses. In the bottom left-figure the data was acquired in the same machine and under the same conditions except that the cable powering a particular motor was removed. The effect of this change is that the data feature mentioned above is no longer visible in the spectrum. This experiment allows the feature previously identified to be labelled as identifying this particular motor that makes part of the machine operating normally. The absence of this data pattern is identified as signalling an abnormal operation where this particular motor is not mechanically moving when it is expected to do so. But this is not the only possible fault mode that can be detected. The bottom right figure shows a spectrogram that was collected in the same machine and under the same conditions as the normal operation, except that a compressed air cable supplying a mechanism associated with the same motor was disconnected. The result of this action is that the pattern labelled as signalling the particular motor operating normally is still present, but no longer looks the same as under normal operation. In this particular case, the signal is still present in the same frequency range as before (16-17 Hz), it is still repeating every 2 minutes and it is still made of four bursts. However, the amplitude of the signal collected with the sensor is fading from burst to bursts and from event to event. This modified pattern is identified as signalling an abnormal operation where this particular motor is mechanically powered, but the associated compressed air mechanism is not receiving enough compressed air pressure. This example illustrates the main points of this invention disclosure with a data pattern that is simple enough to be visually identified and that can be identified easily without the mediation of any data analysis algorithm. Of course, a data analysis method will be able to extract meaningful assessments from much less evident data patterns from the collected data. The Spectrograms in FIG. 6 show a very small fraction of the data collected in the tool. In particular, the frequency window plotted is limited at 20 Hz to focus on the particular event discussed here in the frequency range of 16-17 Hz.

The disclosure should not be seen in any way restricted to the embodiments described and a person with ordinary skill in the art will foresee many possibilities to modifications thereof.

The above described embodiments are combinable.

The invention claimed is:

1. A method for non-invasive vibration-based condition monitoring of a machine and moving parts of the machine, comprising:
   attaching a magnet to an exterior surface of a frame of a machine that comprises the frame and at least one moving part that is located in an interior of the frame and is mechanically coupled to the frame;
   placing a magnetoresistive sensor at a location that is external to the machine, at a distance from the machine, and at a predetermined distance from the magnet, in a manner such that the magnetoresistive sensor is mechanically uncoupled from said machine, and is operating in a dynamic part of a sensor transfer function in respect of a magnetic field produced by the magnet;
   detecting a time-domain magnetic field signal transduced by the magnetoresistive sensor, including a broadband response of the magnetoresistive sensor that includes 0 Hz or a DC component, wherein the time-domain magnetic field signal includes first information representing a first movement of the frame of the machine and second information representing a second movement of the at least one moving part;
   extracting from the time-domain magnetic field signal the second information representing the second movement of the at least one moving part; and
   determining a condition of the at least one moving part located in the interior of the frame of the machine based on the second information representing the second movement of the at least one moving part.

2. The method for non-invasive condition monitoring of a machine and moving parts of the machine according to claim 1, wherein the magnetoresistive sensor comprises a time-domain broadband magnetoresistive sensor having a sensor transfer function of electric resistance versus magnetic field intensity,
   the method further comprising:

operating the magnetoresistive sensor in a linear part of the sensor transfer function in respect of a magnetic field produced by the magnet, wherein the magnetoresistive sensor is selected from the group consisting of: a magnetic tunnel junction, MTJ, sensor; a tunnel magnetoresistance, TMR, sensor; a giant magnetoresistance, GMR, sensor; and an anisotropic magnetoresistive, AMR, sensor.

3. The method for non-invasive condition monitoring of a machine and moving parts of the machine according to claim 1, wherein the magnetoresistive sensor is a magnetic tunnel junction, MTJ, sensor;
the method further comprising arranging the predetermined distance and the MTJ sensor such that the MTJ sensor is being operated within a linear response portion of the MTJ sensor input-output function.

4. The method for non-invasive condition monitoring of a machine and moving parts of the machine according to claim 1, further comprising placing the magnetic sensor on a vibration-dampening or mechanically-decoupled stand.

5. A system for non-invasive vibration-based condition monitoring of a machine and moving parts of the machine, the system comprising:
a time-domain wideband magnetoresistive sensor having a sensor transfer function of electric resistance versus magnetic field intensity, wherein the broadband magnetoresistive sensor has a broadband response that includes 0 Hz or a DC component,
a machine comprising a frame and at least one moving part that is located in an interior of the frame and is mechanically coupled to the frame the machine further comprising a magnet attached on an exterior surface of a frame of the machine,
a time-domain wideband magnetoresistive sensor having a sensor transfer function of electric resistance versus magnetic field intensity, wherein the broadband magnetoresistive sensor has a broadband response that includes 0 Hz or a DC component, the time-domain wideband magnetoresistive sensor being disposed at a location that is external to and mechanically uncoupled from said machine, at a distance from the machine, wherein the magnetoresistive sensor operates in a dynamic part of the sensor transfer function in respect of a magnetic field produced by the magnet; and
an electronic data processor configured for:
detecting a time-domain magnetic field signal transduced by the magnetoresistive sensor including a broadband response of the magnetoresistive sensor that includes 0 Hz or a DC component, wherein the time-domain magnetic field signal includes first information representing a first movement of the frame of the machine and second information representing a second movement of the at least one moving part; and
processing the captured signal to obtain a vibration-based indicator of the machine's condition;
extracting from the time-domain magnetic field signal the second information representing the second movement of the at least one moving part; and
determining a condition of the at least one moving part located in the interior of the frame of the machine based on the second information representing the second movement of the at least one moving part.

6. The system for non-invasive condition monitoring of a machine and moving parts of the machine according to claim 5, wherein the broadband magnetoresistive sensor has a broadband response that includes a lower limit of 0 Hz and an upper limit of 1 KHz to 1 GHz.

7. The system for non-invasive condition monitoring of a machine and moving parts of the machine according to claim 5, wherein the magnetoresistive sensor is selected from the group consisting of: a magnetic tunnel junction, MTJ, sensor; a tunnel magnetoresistance, TMR, sensor; a giant magnetoresistance, GMR, sensor; and an anisotropic magnetoresistive, AMR, sensor.

8. The system for non-invasive condition monitoring of a machine and moving parts of the machine according to claim 5, wherein the magnetoresistive sensor comprises a magnetic tunnel junction, MTJ, sensor, and wherein the electronic data processor is configured for processing the captured signal which is obtained when the MTJ sensor operates within a linear response portion of the MTJ sensor input-output function.

9. The system for non-invasive condition monitoring of a machine and moving parts of the machine according to claim 5, wherein the magnet is a compound magnet comprising an assembly of a plurality of magnets arranged for increasing the gradient of the produced magnetic field.

* * * * *